April 13, 1965 R. H. DRAPER 3,177,607
BOBBER RELEASE MECHANISM
Filed Aug. 19, 1963
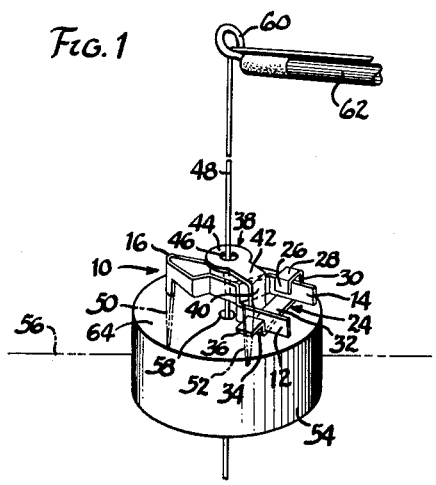
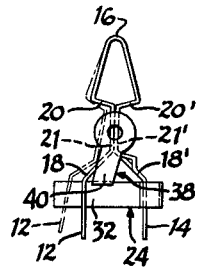
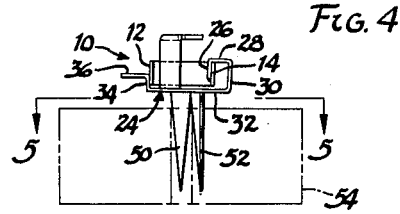
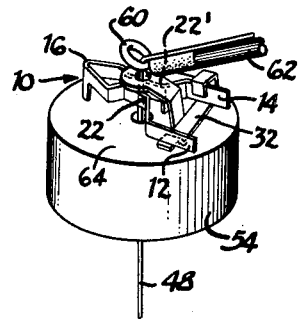
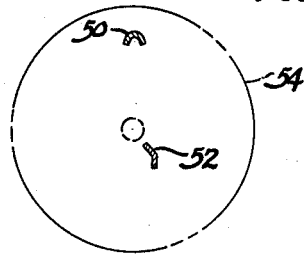
INVENTOR.
RAYMOND H. DRAPER
BY
WILSON, SETTLE & CRAIG
ATTORNEYS : 3,177,607
Patented Apr. 13, 1965

3,177,607
BOBBER RELEASE MECHANISM
Raymond H. Draper, 19944 Northrop, Detroit, Mich.
Filed Aug. 19, 1963, Ser. No. 302,933
2 Claims. (Cl. 43—44.88)

The present invention relates to a release mechanism for a fishing bobber, and more particularly to a release mechanism which operates automatically when the fishing line is reeled in to release the bobber from engagement with the line to permit it to slide freely to the end of the line.

When a fish is caught and the line reeled in, the bobber will eventually abut against the tip of the fishing rod and prevent complete reeling in of the line. It is then necessary for the fisherman to grasp the line and pull the remaining portion in by hand. This is an awkward and cumbersome procedure and frequently causes the loss of the fish. The present invention solves this problem by providing a mechanism on the bobber to release the bobber from engagement with the line for free sliding as soon as the bobber contacts the fishing rod.

It is an object of the invention to provide a fishing bobber having means for releasably securing the bobber to a fishing line.

Another object of the invention is to provide release means for a fishing bobber, the release means having an actuator which is depressed upon contact with a fishing rod to unclamp the bobber from the line.

A further object of the invention is to provide a release mechanism for a fishing bobber which mechanism is detachable from the bobber and may be used with different bobbers.

A still further object of the invention is to provide a bobber release mechanism of relatively simple and inexpensive construction.

Other objects of this invention will appear in the following description and appended claims, reference being had to the accompanying drawings forming a part of this specification wherein like reference characters designate corresponding parts in the several views.

In the drawings:

FIGURE 1 is a perspective view of one embodiment of the present invention showing a bobber, fishing rod and line, and a release mechanism carried by the bobber;

FIGURE 2 is a perspective view similar to FIGURE 1 showing the release mechanism being actuated by the fishing rod;

FIGURE 3 is a top plan view of the release mechanism;

FIGURE 4 is a side elevational view of the release mechanism with a fishing bobber shown in phantom; and FIGURE 5 is a sectional view taken substantially along the line 5—5 of FIGURE 4 looking in the direction of the arrows showing the configuration and location of the release mechanism prong structure.

Before explaining the present invention in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation.

Referring to the drawings, it may be seen that the release mechanism 10 comprises a pair of arms 12, 14 joined together at one end 16 to form a substantially V-shaped configuration. The arms 12, 14 may be fabricated from a flat strip of spring material, however, for the purposes of the invention, it is only necessary that the end portion 16 be of a spring material. The arms 12, 14 have spaced-apart turned-in portions 18, 18' and 20, 20' intermediate the ends thereof. A clamping segment 21, 21' extends between each pair of the turned-in portions to define oppositely disposed clamping surfaces 22, 22'.

Secured to one arm 14 is a catch 24. The catch 24 is a strip of spring material comprising portion 26 which is secured to the arm 14 and from which extends at approximately right angles portions 28, 30. The portion 30 terminates beneath the arm 14 and has extending therefrom an arm 32. The arm 32 terminates at a point beneath the arm 12 and has at its point of termination detent means comprising an upwardly extending portion 34 and an outwardly extending portion 36. An actuator 38 is provided intermediate the ends of the arm 32. The actuator comprises upwardly extending portion 40 and forwardly projecting portion 42. The portion 42 terminates in enlarged circular portion 44 which is positioned above the clamping surfaces 22, 22'. The enlarged portion 44 has an opening 46 for the reception of a fishing line 48.

A pair of prongs 50, 52 are provided on the release mechanism 10 for insertion into cork fishing bobber 54. One prong 50 depends from the portion 16 while the other prong 52 depends from the arm 14. As will be noted in FIGURE 5, the prongs 50, 52 have a curved cross-sectional configuration to provide for secure engagement with the bobber 54.

The operation of the release mechanism 10 in combination with the bobber 54 is illustrated in FIGURES 1 and 2. The bobber, which floats on water surface 56, has an opening 58 through which extends fishing line 48. The line 48 extends from the bobber between clamping surfaces 22, 22' and thence through opening 46 up through eyelet 60 of fishing rod 62 for eventual engagement with a fishing reel (not shown).

As shown in FIGURE 1, the arms 12, 14 have been moved to a position to effect facial contact of the clamping surfaces 22, 22'. The surfaces 22, 22' thus frictionally engage the fishing line and hold the bobber in position.

The arms 12, 14 are held in clamping position by engagement of the arm 12 with the portion 34 of catch 24. In this position, the spring tension on the arms will tend to move them apart and thus will keep arm 12 firmly seated against portion 34.

When a fish has been caught, the line is reeled in to eventually bring the bobber into engagement with the rod 62. When this occurs, the rod forces the actuator 38 downwardly and the actuator carries with it the catch arm 32 to thus release the arm 12. The arms 12, 14 being under spring tension will then move apart as shown in FIGURES 2 and 3. This movement will separate clamping surfaces 22, 22' to release the fishing line 48 and permit the bobber to slide freely. The line can then be reeled in further until the fish has been drawn to a point where it can be boated.

When the release mechanism 10 is mounted on the bobber, it is important that the prongs 50, 52 not be inserted entirely into the bobber. As will be noted in FIGURES 1 and 2, a portion of the prongs extends above the upper surface 64 of the bobber. This condition is necessary to permit the catch arm 32 to be depressed to a point beneath the arm 12 and also to permit free movement of the arm 12. It should also be noted that one of the arms 12, 14 must be freely movable to provide for relative movement between the arms. Consequently, the prongs 50, 52 are provided only on arm 14 and portion 16 and thus restrict movement of only one arm.

In addition to being releasable by engagement with the rod 62, the release mechanism 10 will also be disengaged from the line 48 by a sudden jerk on the line.

A sudden jerk will carry arm 12 upwardly out of engagement with the catch 24. This is advantageous in situations where the fishing hook has been cast into a weeded area. If the line is reeled in in the normal way, the hook will very likely be caught on a weed. However, if the bobber is released from the line, the hook will be drawn up to the bobber and travel on top of the water and over the weeds along with the bobber.

Having thus described my invention, I claim:

1. A fishing bobber construction comprising a fishing bobber having an opening therethrough for a fishing line; means secured to the bobber exteriorly thereof for releasably securing the bobber to a fishing line; said means comprising first and second spring arms joined together at one end; prong means extending from one of said arms into the bobber and spacing the first and second arms from the bobber; a clamping surface provided on each of said arms intermediate the ends thereof; said arms being movable relative to one another to a position effecting facial contact of the clamping surfaces and engagement by said surfaces of a fishing line extending through the bobber; a depressible catch arm secured to and extending from said one of said arms having detent means for engaging the other of said first and second arms in clamping position; said catch arm being positioned in the space between the bobber and the first and second arms; and an actuator extending from the catch arm to a point adjacent the clamping surfaces; said actuator being operable upon the application of a force thereto to depress the catch arm towards the bobber and disengage the first and second arms whereby said first and second arms will move out of clamping position.

2. A release mechanism for a fishing bobber comprising a substantially V-shaped spring element having first and second arms; said arms each having a pair of spaced-apart turned-in portions intermediate the ends thereof; a clamping segment extending between each pair of turned-in portions to define oppositely disposed clamping surfaces; prong means extending from one of said arms for insertion into a fishing bobber; said arms being movable relative to one another to a position effecting facial contact of the clamping surfaces for engagement by said surfaces of a fishing line; a depressible catch arm secured to and extending from said one of said arms having detent means for engaging the other of said first and second arms in clamping position; and an actuator extending from the catch arm to a point adjacent the clamping surfaces; said actuator being operable upon the application of a force thereto to depress the catch arm and disengage the first and second arms whereby said first and second arms will move out of clamping position.

References Cited by the Examiner

UNITED STATES PATENTS

| | | | |
|---|---|---|---|
| 250,848 | 12/81 | Smith | 43—44.91 |
| 1,232,390 | 7/17 | Phillips | 43—44.88 |

ABRAHAM G. STONE, *Primary Examiner.*